US012703162B2

(12) United States Patent
Bemetz et al.

(10) Patent No.: US 12,703,162 B2
(45) Date of Patent: Aug. 11, 2026

(54) METHOD FOR PROVIDING A SUBSTRATE WITH A TINT AND A FUNCTIONAL COLORING

(71) Applicant: Rodenstock GmbH, Munich (DE)

(72) Inventors: Jonas Bemetz, Munich (DE); Herbert Zinner, Rohrbach (DE); Udo Weigand, Munich (DE); Tobias Breu, Zwiesel (DE); Katrin Metz, Munich (DE); Beate Wind, Regen (DE); Christian Dorner, Zwiesel (DE)

(73) Assignee: Rodenstock GmbH, Munich (DE)

( * ) Notice: Subject to any disclaimer, the term of this patent is extended or adjusted under 35 U.S.C. 154(b) by 0 days.

(21) Appl. No.: 18/861,628

(22) PCT Filed: Apr. 20, 2023

(86) PCT No.: PCT/EP2023/060337
§ 371 (c)(1),
(2) Date: Oct. 30, 2024

(87) PCT Pub. No.: WO2023/213556
PCT Pub. Date: Nov. 9, 2023

(65) Prior Publication Data

US 2025/0296288 A1 Sep. 25, 2025

(30) Foreign Application Priority Data

May 2, 2022 (DE) ..................... 10 2022 110 731.0

(51) Int. Cl.
*B29D 11/00* (2006.01)
*G02C 7/10* (2006.01)

(52) U.S. Cl.
CPC .. *B29D 11/00923* (2013.01); *B29D 11/00653* (2013.01); *B29D 11/00903* (2013.01); *G02C 7/102* (2013.01); *G02C 7/108* (2013.01)

(58) Field of Classification Search
CPC ........ B29D 11/00923; B29D 11/00653; B29D 11/00903; B29D 11/00009; G02C 7/102; G02C 7/108
See application file for complete search history.

(56) References Cited

U.S. PATENT DOCUMENTS

2002/0118431 A1* 8/2002 Sommer ................ G02B 1/041 359/241
2003/0045612 A1* 3/2003 Misura ................ C08K 5/0041 523/456

(Continued)

OTHER PUBLICATIONS

Patent Cooperation Treaty (PCT), International Search Report and Written Opinion for Application PCT/EP2023/060337 filed on Apr. 20, 2023, mailed Sep. 26, 2023, International Searching Authority, EP.

*Primary Examiner* — Michael G Miller
(74) *Attorney, Agent, or Firm* — McDonald Hopkins LLC

(57) ABSTRACT

The present invention relates to a method for providing a substrate with a tint and a functional coloring, comprising the following steps (a) to (c) in this order: (a) providing a substrate to be provided with a tint and a functional coloring, the substrate being made of plastic glass and the substrate having a first main side and a second main side with a convex shape opposite the first main side, (b) applying a tint to both main sides of the substrate provided in step (a), and (c) applying a functional coloring to both main sides of the substrate provided with a tint on both main sides in step (b) by dip coating, thereby obtaining a substrate provided with a tint and a functional coloring on both main sides.

7 Claims, 1 Drawing Sheet

(56) References Cited

U.S. PATENT DOCUMENTS

| | | | | |
|---|---|---|---|---|
| 2007/0229756 | A1* | 10/2007 | Mandler | B24B 13/005 351/159.74 |
| 2012/0176657 | A1 | 7/2012 | Marinelli | |
| 2018/0299702 | A1 | 10/2018 | Nguyen et al. | |

* cited by examiner

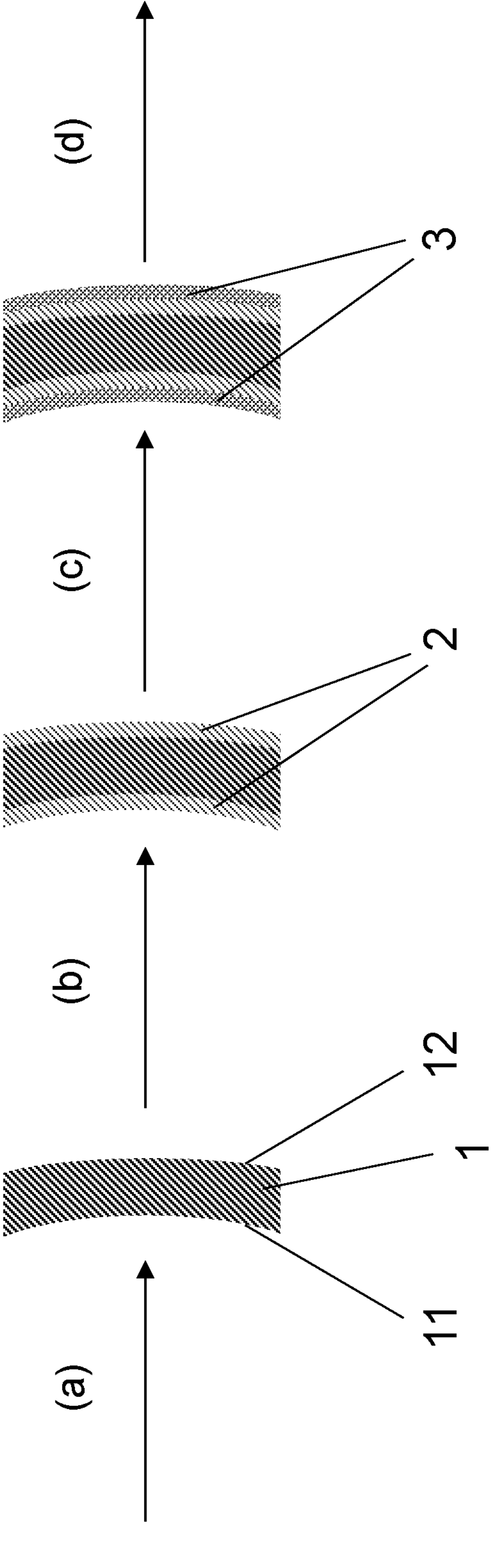
(a)
(b)
(c)
(d)
11
1
12
2
3

METHOD FOR PROVIDING A SUBSTRATE WITH A TINT AND A FUNCTIONAL COLORING

CROSS-REFERENCE TO RELATED APPLICATION

This application is a 35 U.S.C. 371 national stage filing of PCT Application No. PCT/EP2023/060337 filed on Apr. 20, 2023, which claims priority to German Patent Application No. 102022110731.0 filed on May 2, 2022, each of which are incorporated herein by reference in their entireties.

The present invention relates to a method for providing a substrate with a tint and a functional coloring.

Self-tinting spectacle lenses, also known as photochromic spectacle lenses, can react to UV light. Depending on the intensity of the UV light hitting the spectacle lens, the spectacle lens tints dark or bright. Darkening or brightening of the spectacle lens is made possible by a functional coloring with which the spectacle lens is provided. The functional coloring is caused by a photochromic dye, which reacts to irradiation with UV light with a reversible change in its molecular structure and thus also its absorption behavior. When the irradiation with UV light ceases, the photochromic dye returns to its original molecular structure and thus also its original absorption behavior. A photochromic dye thus enables reversible switching between a dark and a bright tint.

In addition to the functional coloring, the spectacle lens can also be provided with a tint. The tinting gives the spectacle lens a certain shade, which is particularly desirable for sunglasses. In contrast to functional coloring, dyes are used for tinting which-apart from their absorption properties-do not have any functional properties and are referred to as non-functional dyes.

In the manufacturing methods established in the prior art, the functional coloring is introduced directly into the glass material or applied to the glass material in the form of an additional layer, for example by spin coating. However, tinting of glass materials pretreated in this way is often not reproducible. In addition, the functional coloring is impaired by tinting, since the ranges of the electromagnetic spectrum required for darkening are absorbed by the non-functional dye of the tint and are therefore not available to the photochromic dye of the functional coloring.

Against this background, the present invention is based on the object of providing a method that allows a substrate to be provided with a tint in addition to a functional coloring, whereby the method to be provided is to enable a reproducible tinting of the substrate without impairing its functional coloring.

The above object is achieved by the embodiments of the present invention as characterized in the claims.

According to the present invention, a method for providing a substrate with a tint and a functional coloring is provided, the method according to the invention comprising the following steps (a) to (c) in this order:

(a) providing a substrate to be provided with a tint and a functional coloring, the substrate being made of plastic glass and the substrate having a first main side and a second main side with a convex shape opposite the first main side, (b) applying a tint to both main sides of the substrate provided in step (a), and (c) applying a functional coloring to both main sides of the substrate provided with a tint on both main sides in step (b) by dip coating, thereby obtaining a substrate provided with a tint and a functional coloring on both main sides.

The method according to the invention enables a reproducible tinting of the substrate without impairing its functional coloring. The reason for this lies in the specific sequence of the method steps. Since the functional coloring is applied after the tint is applied, the disadvantages occurring with the manufacturing methods established in the prior art can be avoided. Advantageously, the substrate obtained with the method according to the invention is provided with both the tint and the functional coloring on both sides, which is desirable not least for aesthetic reasons.

The method according to the invention for providing a substrate with a tint and a functional coloring, which is shown schematically in FIG. 1, will be described in more detail below:

In step (a) of the method according to the invention, a substrate to be provided with a tint and a functional coloring is provided. According to the present invention, the substrate is made of plastic glass. Plastic glass has the advantage over mineral glass that it has a lower density and is therefore lighter for the same substrate size. Furthermore, plastic glass has a higher breakage resistance than mineral glass. Corresponding plastic materials for the production of plastic spectacle lenses are known to the person skilled in the art. For example, the substrate can be made of polythiourethane, polymethyl methacrylate, polycarbonate, polyacrylate, polydiethylene glycol bisallyl carbonate or a combination thereof, although in principle other transparent plastic materials can also be used.

The substrate has a first main side and a second main side opposite the first main side. The first main side of the substrate corresponds to the back of the future spectacle lens, which faces the wearer, whereas the second main side of the substrate corresponds to the front of the future spectacle lens, which faces away from the wearer. According to the present invention, the second main side of the substrate has a convex shape. As far as the shape of the first main side of the substrate is concerned, the method according to the invention is not further restricted. For example, the first main side of the substrate can have a concave or planar shape, as described in more detail below.

If the substrate provided in step (a) is a finished part, the first main side of the substrate typically has a concave shape. In the present case, a finished part is understood to mean a finished product that can readily be used for a predetermined purpose, such as a lens for a spectacle lens. A finished part has therefore already been brought into a final geometric shape with regard to its later use. The concave shape of the first main side of the substrate therefore does not require any surface machining. The same applies to the convex shape of the second main side of the substrate.

If the substrate provided in step (a) is a half-part, the first main side of the substrate typically has a planar or concave shape. In the present case, a half-part, sometimes also referred to as a “blank”, is understood to mean a semi-finished product that differs from a finished product in that it cannot readily be used for the predetermined purpose. A half-part has therefore not yet been given a final geometric shape with regard to its later use. The planar or concave shape of the first main side of the substrate therefore requires surface machining in order to adapt the substrate to later requirements, for example in relation to the desired optical effect, for example in relation to the desired refractive power as it results from an ophthalmic prescription. To this end, part of the substrate material is removed from the first main side while forming or retaining the concave shape. Not only in the case of the finished part, but also in the case of the half-part, does the second main side of the substrate already correspond to the final optically effective surface. Thus, also in the case of a half-part, the convex shape of the second main side of the substrate does not require any surface machining.

If the planar or concave shape of the first main side of the substrate is subjected to surface machining, as is the case with a half-part, this will take place prior to step (b). According to the present invention, surface machining is not further restricted. It can be carried out, for example, by milling, grinding, polishing or a combination thereof. In principle, however, any other form of surface machining is conceivable.

In step (b) of the method according to the invention, tint is applied to both main sides of the substrate provided in step (a). The tint serves solely to give the substrate a certain color shade. As mentioned at the beginning, dyes are used here that-apart from their absorption properties-do not have any functional properties whatsoever and therefore do not allow reversible switching back and forth between a dark and a bright shade. Accordingly, non-functional dyes, as used in the method according to the invention, are non-photochromic. Various classes of non-functional dyes are described in the prior art. These are often azo dyes, cyanine dyes, anthraquinone dyes or the like, which are often used in conventional tinting of spectacle lenses. The person skilled in the art will routinely select a suitable non-functional dye or a mixture of suitable non-functional dyes.

As far as the application of the tint in step (b) is concerned, the method according to the invention is not further restricted. In a preferred embodiment, the application of the tint in step (b) is carried out by immersing the substrate in a dyeing tank containing at least one non-functional dye dissolved or dispersed in a liquid medium. As a result of immersion in the dyeing tank, the substrate is completely provided with the tint. In particular, both main sides of the substrate are provided with the tint. The dyeing tank is not subject to any particular restriction as long as it can provide the substrate with a tint.

The dyeing tank, which can be part of a conventional dyeing system that can be used for a variety of applications, is filled with a liquid medium. The at least one non-functional dye is dissolved or dispersed therein. The liquid medium can be a water bath, but is not limited thereto. To facilitate the application of the tint to the substrate, the liquid medium is typically heated to a temperature in the range of 60 to 100° C., for example to a temperature in the range of 75 to 95° C., with the adjustable heating temperature of the liquid medium depending not least on its boiling point. At a higher temperature, the absorption of the non-functional dye by the surface of the substrate is promoted. Further details regarding the dyeing process in a dyeing tank are known to the person skilled in the art.

Finally, the extent of dye absorption can be controlled based on the duration of the immersion. It holds that the extent of dye absorption increases with the duration of the immersion. As the extent of dye absorption increases, the transmission of the substrate provided with a tint on both main sides in step (b) decreases. The desired transmission of the substrate, also referred to as target transmission, can therefore be specifically adjusted in step (b), which enables reproducible tinting of the substrate.

In step (c) of the method according to the invention, a functional coloring is applied to both main sides of the substrate provided with a tint on both main sides in step (b). As a result, a substrate provided with a tint and a functional coloring on both main sides is obtained. The functional coloring serves to give the substrate a certain functional property. If the functional property is based on a reversible change in the absorption behavior, caused by an external stimulus such as UV light, the functional coloring can be caused by at least one photochromic dye. Various classes of photochromic dyes are described in the prior art. These are often chromenes, viologens, fulgides and fulgimides and in particular spiro compounds such as spirooxazines or spiropyrans, but are not limited thereto. The person skilled in the art will routinely select a suitable photochromic dye or a mixture of suitable photochromic dyes.

According to the present invention, in step (c) the functional coloring is applied by dip coating, which can be carried out in a conventional dip coating system that can be used for a variety of applications. In comparison to spin coating, in which initially only one of the two main sides of the substrate is provided with a functional coloring, dip coating requires significantly less equipment. Naturally, with dip coating, the substrate is completely provided with the functional coloring. In particular, both main sides of the substrate are provided with the functional coloring. If the functional coloring is caused by at least one photochromic dye, the substrate provided with a tint on both main sides is expediently immersed in a photoresist containing the at least one photochromic dye. The photoresist forms a polymer layer on the substrate. This layer is not influenced by the tint underneath. The functional coloring is therefore not impaired by tinting.

Apart from steps (a) to (c), the method according to the invention can further comprise a step of applying one or more finishing layers to at least one of the two main sides of the substrate obtained in step (c), which has a tint and a functional coloring on both main sides, hereinafter also referred to as step (d). If provided, step (d) is therefore carried out subsequently to steps (a) to (c), with both main sides of the substrate usually being coated. Typical finishing layers include hard layers, which serve to protect against scratches, interference/anti-reflection layers, which serve to reduce reflections, and easy-to-clean layers, sometimes also referred to as "topcoat" or "cleancoat", which serve to repel water and dirt, but are not limited thereto. The person skilled in the art is aware of appropriate measures for applying such finishing layers. The application of a hard layer can be achieved, for example, by dip coating, wherein the same dip coating system as in step (c) can be used. To this end, the substrate provided with a tint and a functional coloring on both main sides is dipped into a hard lacquer. If a photoresist is used when the functional coloring is applied in step (c), it may be necessary to remove excess photoresist residues from the edges of the substrate prior to finishing in step (d).

According to the present invention, the substrate is provided with a tint and a functional coloring on both main sides. The substrate, which is provided with a tint and a functional coloring on both sides and is obtainable using the method according to the invention, is versatile and can be used, for example, as a lens for a spectacle lens. The substrate is then edge-machined to fit it into a glasses frame.

DESCRIPTION OF THE FIGURE

FIG. 1 shows a schematic representation of the method according to the invention. Step (d), which is also shown in FIG. 1, is optional.

LIST OF REFERENCE NUMERALS

| | |
|---|---|
| 1 | substrate |
| 11 | first main side of the substrate |
| 12 | second main side of the substrate |
| 2 | tint |
| 3 | functional coloring |

EXAMPLE

The following embodiment serves to further explain the present invention, but is not limited thereto.

In accordance with the method according to the invention, substrates were provided with a tint and a functional coloring on both sides. Different non-functional dyes such as anthraquinone dyes or azo dyes were used for tinting. In contrast, always the same photochromic dye was used for the functional coloring.

Half-parts made of plastic glass with a first main side, which had a planar shape, and a second main side, which had a convex shape, were provided as substrates. The first main side of the half-parts was subjected to surface machining in each case. This was done by grinding, whereby part of the substrate material was removed from the first main side, forming a concave shape to achieve the desired optical effect.

Subsequently, the surface-machined substrates were immersed in a dyeing tank. It contained the respective non-functional dye for tinting in an aqueous solution. By immersing the substrates in the dyeing tank, they were provided with the tint on both sides. The duration of the immersion was chosen so that the target transmission was achieved. The dyeing process took place at a temperature in the range of 60 to 100° C.

The substrates provided with the tint on both sides were then immersed in a photoresist containing the photochromic dye for the functional coloring, whereby the substrates were also provided with the functional coloring on both sides.

A hard layer was then applied to both main sides of the substrates provided with the tint and the functional coloring on both sides, which was done by immersing the substrates in a hard lacquer. An interference/anti-reflection layer was then applied to them. The substrates obtained in this way had all the necessary properties and thus represented uncut spectacle lenses, which could then be edge-machined to fit into a spectacle frame.

As can be seen from the above embodiment, the method according to the invention allows the substrate to be reproducibly tinted without impairing its functional coloring.

The invention claimed is:

1. A method for providing a substrate with a tint and a functional coloring, comprising the following steps (a) to (c) in this order:

(a) providing a substrate to be provided with a tint and a functional coloring, the substrate being made of plastic glass and the substrate having a first main side and a second main side with a convex shape opposite the first main side, (b) applying a tint to both main sides of the substrate provided in step (a), wherein the application of the tint in step (b) is carried out by immersing the substrate in a dyeing tank containing at least one non-functional dye dissolved or dispersed in a liquid medium, and (c) applying a functional coloring to both main sides of the substrate provided with a tint on both main sides in step (b) by dip coating, wherein the functional coloring is caused by at least one photochromic dye, and the substrate provided with a tint on both main sides is immersed in a photoresist containing the at least one photochromic dye, whereby the photoresist forms a polymeric layer on the substrate and a substrate provided with a tint and a functional coloring on both main sides is obtained, wherein the polymeric layer having the functional coloring is not removed from both main sides of the substrate.

2. The method according to claim 1, wherein the substrate provided in step (a) is made of polythiourethane, polymethyl methacrylate, polycarbonate, polyacrylate, polydiethylene glycol bisallyl carbonate or a combination thereof.

3. The method according to claim 1, wherein the substrate provided in step (a) is a finished part with a concave shape of the first main side, which does not require surface machining.

4. The method according to claim 1, wherein the substrate provided in step (a) is a half-part with a planar or concave shape of the first main side, which is subjected to surface machining prior to step (b).

5. The method according to claim 4, wherein surface machining is carried out by milling, grinding, polishing or a combination thereof.

6. The method according to claim 1, further comprising the following step (d):

applying one or more finishing layers to at least one of the two main sides of the substrate obtained in step (c), which is provided with a tint and a functional coloring on both main sides.

7. The method according to claim 6, wherein the substrate provided with a tint and a functional coloring on both main sides is immersed in a hard lacquer for applying a hard layer.

* * * * *